US011607589B1

(12) United States Patent
Van Denend

(10) Patent No.: US 11,607,589 B1
(45) Date of Patent: Mar. 21, 2023

(54) DEVICE FOR ACCURATELY MEASURING STRING BED STIFFNESS IN A RACKET

(71) Applicant: Mark E. Van Denend, Lackawaxen, PA (US)

(72) Inventor: Mark E. Van Denend, Lackawaxen, PA (US)

( * ) Notice: Subject to any disclaimer, the term of this patent is extended or adjusted under 35 U.S.C. 154(b) by 247 days.

(21) Appl. No.: 17/060,880

(22) Filed: Oct. 1, 2020

(51) Int. Cl.
*A63B 51/005* (2015.01)
*G01L 5/107* (2020.01)

(52) U.S. Cl.
CPC ............ *A63B 51/005* (2013.01); *G01L 5/107* (2013.01)

(58) Field of Classification Search
CPC ............................... A63B 51/005; G01L 5/107
See application file for complete search history.

(56) References Cited

U.S. PATENT DOCUMENTS

| | | | |
|---|---|---|---|
| 1,469,280 A | 10/1923 | Stahl | |
| 2,249,839 A | 7/1941 | Lessmann | |
| 2,257,483 A | 9/1941 | Roche | |
| 2,401,876 A | 6/1946 | Marker et al. | |
| 3,177,708 A | 4/1965 | Saxl | |
| 3,720,100 A | 3/1973 | Grunbaum | |
| 3,823,609 A | 7/1974 | Miyagawa et al. | |
| 3,831,442 A | 8/1974 | Cummins et al. | |
| 3,834,225 A | 9/1974 | Burchett | |
| 3,879,999 A | 4/1975 | Saxl | |
| 4,055,999 A * | 11/1977 | Cope | A63B 51/005 73/862.452 |
| 4,077,256 A | 3/1978 | Hollander | |
| 4,103,546 A * | 8/1978 | Hickey | A63B 51/005 73/862.471 |
| 4,116,054 A * | 9/1978 | Howe | A63B 51/005 73/862.454 |
| 4,241,616 A | 12/1980 | Mastrigt | |

(Continued)

FOREIGN PATENT DOCUMENTS

| | | |
|---|---|---|
| CN | 101590974 A | 12/2009 |
| CN | 101706392 A | 5/2010 |

(Continued)

*Primary Examiner* — Raleigh W Chiu
(74) *Attorney, Agent, or Firm* — Richard M. Goldberg

(57) ABSTRACT

A device for measuring stiffness of the string bed of a racket, includes a main body adapted to sit on the string bed; a force measuring device mounted to the main body; a biasing arrangement connected to the force measuring device and adapted to be connected to the string bed for deflecting the string bed in relation to the force measuring device, and causing the force measuring device to output a signal corresponding to the deflection of the string bed; a stop connected to the main body in a manner such that the stop is not acted upon by the deflection of the string bed when deflected by the biasing arrangement and which limits the string bed to a predetermined amount of deflection by the biasing arrangement; a switch to provide an output when the string bed is deflected to at least a predetermined position; a display for displaying the stiffness of the string bed in accordance with the signal output from the force measuring device in response to a change in the output from the switch as the string bed moves from the deflected position to an undeflected position; and a positioning device to repeatably position the string bed stiffness measuring device on the string bed.

17 Claims, 18 Drawing Sheets

(56) References Cited

U.S. PATENT DOCUMENTS

| | | | |
|---|---|---|---|
| 4,309,910 A | 1/1982 | Walker, Jr. | |
| 4,338,825 A | 7/1982 | Amlani et al. | |
| 4,488,444 A | 12/1984 | Weidmann et al. | |
| 4,590,808 A * | 5/1986 | Lightfoot | G01L 5/102 |
| | | | 73/818 |
| 4,607,535 A | 8/1986 | Okamuro | |
| 4,747,314 A * | 5/1988 | Huang | G01L 5/08 |
| | | | 73/65.03 |
| 4,794,805 A * | 1/1989 | Carney | G01L 5/10 |
| | | | 73/862.471 |
| 4,800,758 A | 1/1989 | Knecht et al. | |
| 4,846,002 A * | 7/1989 | Brunner | A63B 51/005 |
| | | | 73/862.471 |
| 4,864,875 A | 9/1989 | Wise | |
| 4,876,900 A * | 10/1989 | Carney | G01L 5/106 |
| | | | 73/862.474 |
| 5,048,352 A | 9/1991 | Artola Ugarte | |
| 5,094,109 A | 3/1992 | Dean et al. | |
| 5,123,284 A * | 6/1992 | Edinburgh | G01L 5/106 |
| | | | 73/159 |
| 5,133,217 A * | 7/1992 | Jordan | A63B 51/005 |
| | | | 73/862.471 |
| 5,222,391 A | 6/1993 | Reenstra | |
| 5,289,826 A | 3/1994 | Kovacevic | |
| 5,299,462 A | 4/1994 | Key | |
| 5,461,929 A | 10/1995 | Jordan | |
| 5,481,926 A | 1/1996 | Manson | |
| 5,733,212 A | 3/1998 | Wise et al. | |
| 5,760,312 A | 6/1998 | MacKay et al. | |
| 5,837,889 A | 11/1998 | Slenker | |
| 5,915,979 A | 6/1999 | Schell et al. | |
| 6,132,326 A | 10/2000 | Schweid et al. | |
| 7,538,959 B1 | 5/2009 | Wheeler | |
| 2003/0027670 A1 | 2/2003 | van der Pols | |
| 2007/0275798 A1* | 11/2007 | Brunner | A63B 47/008 |
| | | | 473/553 |
| 2007/0295187 A1 | 12/2007 | Longo et al. | |
| 2009/0215558 A1 | 8/2009 | Bothwell | |
| 2011/0183787 A1* | 7/2011 | Schwenger | A63B 60/42 |
| | | | 473/553 |
| 2012/0312101 A1* | 12/2012 | Loreau | A63B 51/005 |
| | | | 73/828 |
| 2014/0194230 A1 | 7/2014 | Lazarov | |

FOREIGN PATENT DOCUMENTS

| | | |
|---|---|---|
| CN | 102657932 A | 9/2012 |
| CN | 102951541 A | 3/2013 |
| CN | 103055477 A | 4/2013 |
| CN | 202994356 U | 6/2013 |
| CN | 104308629 A | 1/2015 |
| CN | 204221490 U | 3/2015 |
| CN | 105388064 A | 3/2016 |
| CN | 109060222 A | 12/2018 |
| DE | 3532767 A1 | 3/1987 |
| DE | 1410318 A1 | 9/1995 |
| DE | 19521517 C1 | 10/1996 |
| DE | 19608995 C1 | 7/1997 |
| DE | 102012017317 B3 | 11/2013 |
| FR | 567476 A | 3/1924 |
| FR | 2617282 A1 | 12/1988 |
| JP | 3144416 U | 8/2008 |
| WO | 8903709 A1 | 5/1989 |
| WO | 9000249 A1 | 1/1990 |
| WO | 9005288 A1 | 5/1990 |
| WO | 9012297 A1 | 10/1990 |
| WO | 9110480 A1 | 7/1991 |

* cited by examiner

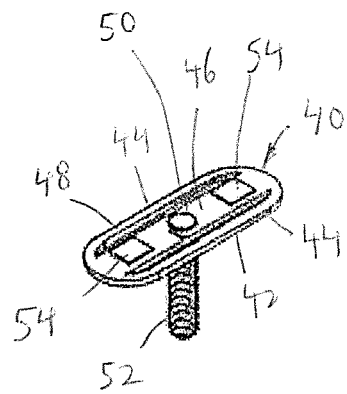
FIG. 10
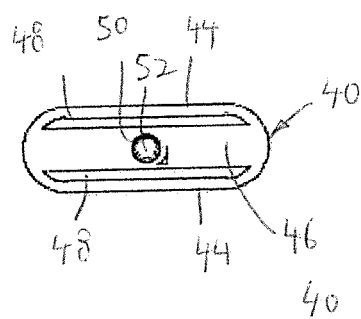
FIG. 11
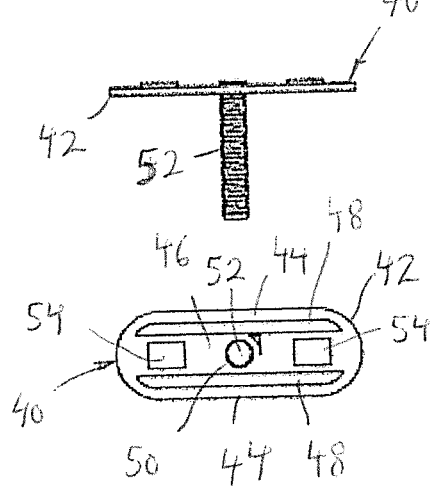
FIG. 12
FIG. 13

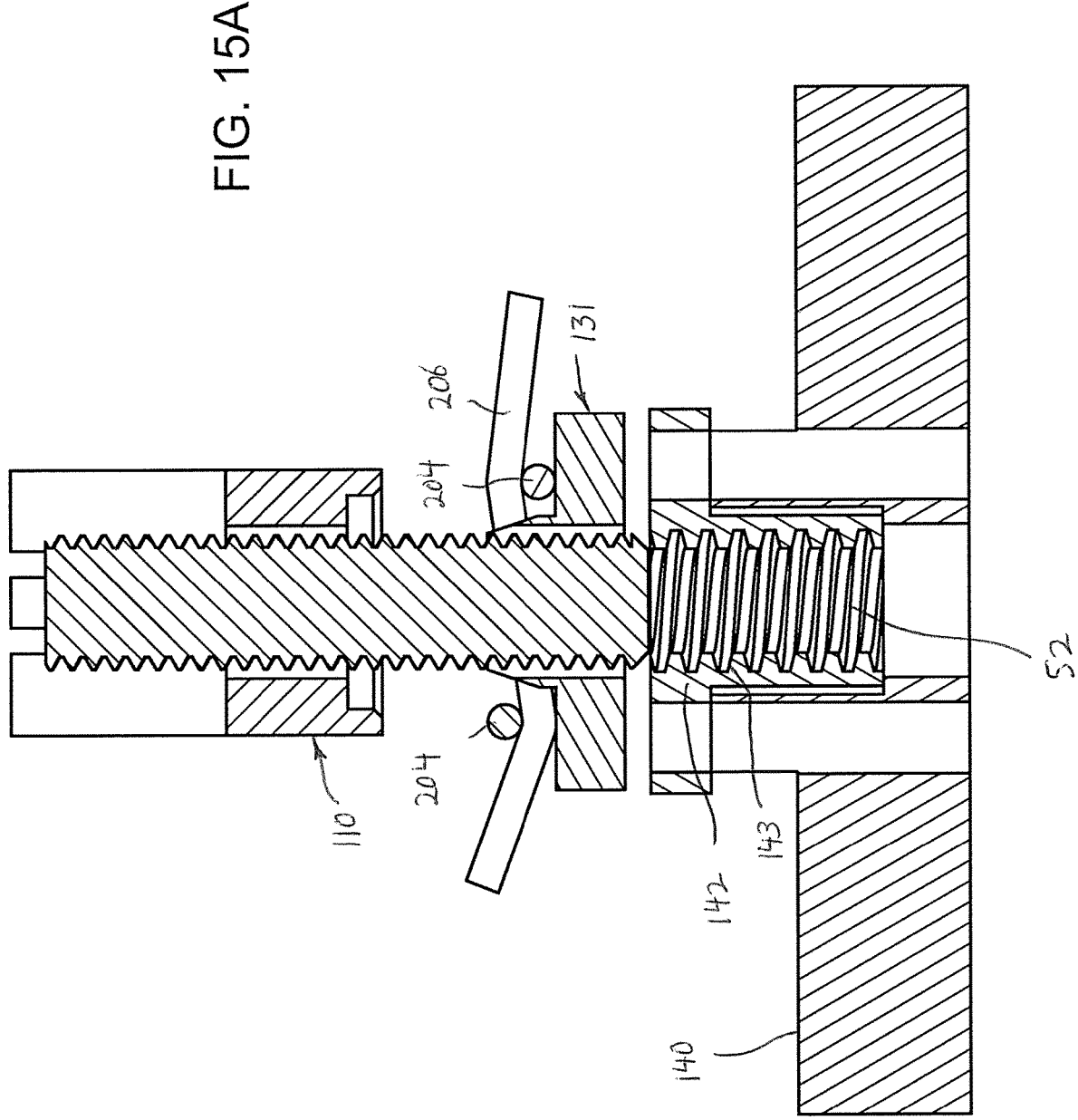

FIG. 38
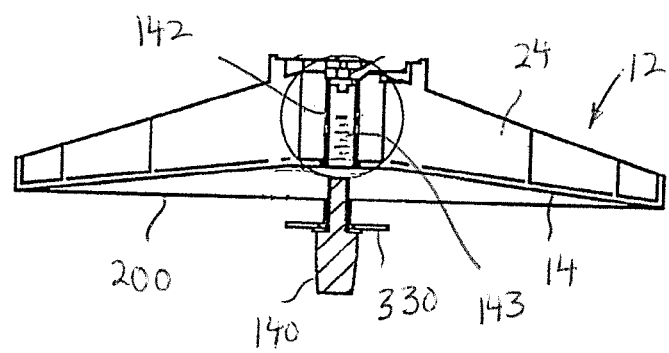
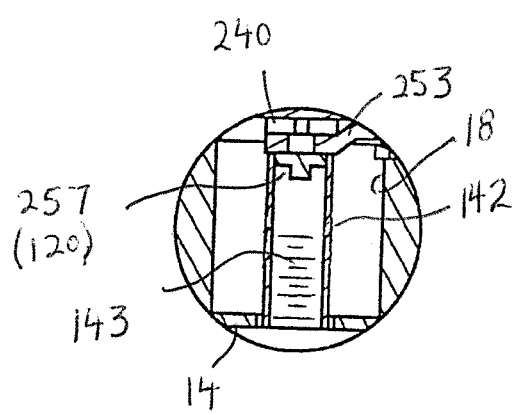
FIG. 39

DEVICE FOR ACCURATELY MEASURING STRING BED STIFFNESS IN A RACKET

BACKGROUND OF THE INVENTION

The present invention relates generally to a device for measuring the string bed stiffness of strings of a racket, and in particular, a tennis racket.

The importance of determining the string bed stiffness of strings in a tennis racket is recognized by tennis players, since this will have an effect on the rebound and accuracy during play. Many tennis players have several rackets, each strung to a different tension and which can be selectively used, depending upon conditions of play. The stringing tension, the size and type of racket and the string used will determine the string bed stiffness. String bed stiffness is therefore an important component of how the racket plays.

However, over time, the strings will loosen and the string bed stiffness will decrease. Thus, a racket having an initial satisfactory degree of tension, will gradually deteriorate in string bed stiffness, requiring restringing of the racket. Over time, this is difficult to determine by the player since the change occurs gradually.

Further, it is known that gut strings have a much different spring factor than polyester strings and hold the spring factor longer than polyester strings.

It is therefore desirable to have a convenient means of measuring changes in string bed stiffness due to loss of string tension. In doing so, the spring factor and, in particular, the string bed must be taken into account. Specifically, measurement of the string bed stiffness considers both the tension, the string spring factor and the size of the racket head.

Various devices exist that attempt to measure string bed stiffness, which is the only meaningful measurement of a strung racket. These known devices measure the string bed stiffness of a strung racket by deflecting the string bed by a fixed distance and then measuring the force exerted by the deflection.

However, these known devices are not satisfactory for a number of reasons. First, many of these devices are extremely costly. For example, the Babolat Racket Diagnostic Center is a machine that costs over $3,000 and measures the string bed stiffness of a strung racket by deflecting the string bed a fixed distance, and measuring the force exerted by the deflection.

A second problem with many of these devices is that they are large and complex, and cannot be used by the average tennis player or ordinary person. In other words, they have substantial bulk and weight.

For example, the machine sold by the Dutch company Stringway VOF Company under the trademark STRINGWAY detects the bed surface electronically and then moves the surface 10 mm. This accounts for racket thickness differences and string gauge differences. However, this device is expensive, complicated, bulky and not portable.

A third disadvantage of many of these devices is that they are difficult and complex to use by any ordinary tennis player.

A fourth disadvantage of many of these devices is there is a lack of accuracy and lack of measurement repeatability. Related thereto is the fact that many of these devices have mechanical creep over continued use, which will result in different measurements over time for the same string bed stiffness measurement. Specifically, many of these devices are constructed from plastic, which under the force of 40 to 80 lbs. of pressure, will deflect and exhibit mechanical creep. This deflection or mechanical creep will change the measurement, because such deflection and/or creep will slightly change the distance the string bed is deflected.

A fifth disadvantage of many of these devices is that they do not measure the same place on the string bed from one measurement to the next. This results in different measurements.

A sixth disadvantage of many of these devices is that they do not interface with the string bed pulling or pushing at the interstice of only four strings. This results in different measurements.

A seventh disadvantage is that many of these devices do not easily compensate for string gauge variation or notching or fraying of the strings. Prior art which does compensate requires a cumbersome means to change a part for each string bed gauge and/or expensive means to measure the surface of the string bed position prior to deflection. Even with the change of this part, this prior art will not compensate for a change in thickness of the string bed due to notching or fraying of the strings.

SUMMARY OF THE INVENTION

Accordingly, it is an object of the present invention to provide a device for measuring string bed stiffness in the strings of a racket that overcomes the aforementioned problems.

It is another object of the present invention to provide a device for measuring string bed stiffness in the strings of a racket that provides consistent measurements over time, regardless of mechanical creep or slight deflection of the system.

It is still another object of the present invention to provide a device for measuring string bed stiffness in the strings of a racket that is lightweight and portable, and is easily usable by an average person.

It is yet another object of the present invention to provide a device for measuring string bed stiffness in the strings of a racket that provides reliable and meaningful measurements.

It is a further object of the present invention to provide a device for measuring string bed stiffness in the strings of a racket that is adjustable to be used with different sizes, shapes and stringing patterns of different string beds.

It is a still further object of the present invention to provide a device for measuring string bed stiffness in the strings of a racket which repeatedly and accurately positions the device and locates the device to a predetermined location, which location is predetermined based on the dimensions, shape and stringing patterns of the string bed.

It is another object of the present invention to provide a device for measuring string bed stiffness in the strings of a racket that always provides an exact base line amount of deflection of the string bed during such measurement.

It is still another object of the present invention to provide a device for measuring string bed stiffness of strings of a racket that is inexpensive to manufacture and easy to use.

In accordance with an aspect of the present invention, a device for measuring string bed stiffness in the string bed of a racket, includes a main body adapted to sit on top of the string bed; a force measuring device mounted to the main body; a biasing arrangement connected to the force measuring device and adapted to be connected to the string bed for biasing the string bed toward the force measuring device, and causing the force measuring device to output a signal corresponding to the biasing of the string bed; and a display for displaying the string bed stiffness in accordance with the signal output from the force measuring device.

It further includes a string bed deflection measuring arrangement for measuring an amount of deflection of the string bed from a neutral unbiased position due to the biasing of the string bed by the biasing arrangement, the string bed deflection measuring arrangement including a stop on top of the main body and connected only at ends thereof to the main body, so that the stop is not deflected due to the biasing of the string bed by the biasing arrangement. The stop stops the movement of the biasing arrangement. One embodiment includes a switch positioned between the string bed and the stop, and activated when the biasing arrangement is moved to a predetermined distance. The software and circuitry of the printed circuit board remembers the force of the force measuring device, for example, the resistance of a strain gauge at this position. The software compares this position with this force measured in the undeflected position and displays the corresponding force in a form understood by the operator. The preferred embodiment includes a switch positioned between the string bed and the stop, and activated when the biasing arrangement is moved at least a certain distance relative to the stop when the string bed is deflected by at least a predetermined amount. The switch is deactivated, indicating the predetermined distance being attained, as the biasing arrangement moves from the fully deflected position to the undeflected and unbiased position. An alternative embodiment includes a stop which is connected to the main body in a way that it moves with the main body. This embodiment is not as accurate or repeatable, especially if the main body is subject to deflection during use and mechanical creep after continuous use.

For the purpose of the present invention, a switch is a device for making, breaking, or changing the connections in an electrical circuit. Regardless of the location of the switch, the change in connection of the electrical circuit occurs as the biasing arrangement moves the string bed by the predetermined amount.

The main body preferably has a generally elliptical shape. The main body further includes a positioning arrangement for positioning the main body relative to a repeatable location of the string bed. The positioning arrangement includes at least one tab, and preferably two tabs. The position of the tabs relative to the openings in the string bed may be adjusted so that they exactly engage the string bed.

The main body includes a central opening, and the force measuring device is mounted to the main body at the central opening.

Preferably, the force measuring device includes a strain gauge arrangement for measuring force on the string bed during deflection thereof by the biasing arrangement.

The biasing arrangement includes a threaded shaft having one end connected to the force measuring device, and a threaded nut adapted to threadedly engage an opposite end of the threaded shaft on an opposite side of the string bed from the force measuring device. The biasing arrangement further includes a pushing body engageable within four strings, namely, two main strings and two cross strings, of the string bed and positioned between the string bed and the threaded nut.

The string bed deflection measuring arrangement includes a connection pusher arranged on the threaded shaft between the face of the string bed and the switch for controlling the switch to activate when the string bed is moved the predetermined amount. The connection pusher is in contact with the string bed and moves as the string bed is deflected. Since the connection pusher is in contact with the side of the string bed which is between the stop and the string bed, a change in the string gauge will not affect the predetermined movement. Additionally, a change in thickness of the string bed because of, for example, notching or fraying of the strings will not affect the predetermined movement.

In one embodiment, the switch is mounted to the connection pusher, and is activated when the switch contacts the stop when the string bed is deflected by the predetermined amount. In another embodiment, the switch is mounted to the stop, and is activated when the connection pusher contacts the switch when the string bed is deflected by the predetermined amount.

An audio indicator and/or visual indicator provides an indication, in response to an output of the switch, when the string bed has been deflected by the predetermined amount.

In addition, an audio indicator and/or visual indicator provides an indication, in response to an output of the force measuring device, when the output average signal from the force measuring device has stopped changing for a predetermined time period.

In addition, circuitry and programming is provided to measure the change in the signal from the force measuring device between the biased position and the change of output or deactivation from the switch to the unbiased position when the output average signal from the force measuring device has stopped changing for a predetermined time period.

In another embodiment, the aforementioned stop 60 is eliminated in situations where any deflection of main body 12 is minimal at most. In such case, a device for measuring stiffness of the string bed of a racket, includes a main body adapted to sit on the string bed; a force measuring device mounted to the main body; a biasing arrangement connected to the force measuring device and adapted to be connected to the string bed for deflecting the string bed in relation to the force measuring device, and causing said force measuring device to output a signal corresponding to the stiffness of the string bed; a display for displaying the stiffness of the string bed in accordance with the signal output from the force measuring device; a stop connected to the main body and positioned to stop the biasing arrangement when the string bed is deflected a certain distance; and a positioning arrangement for positioning the main body on the string bed, the positioning arrangement including at least one tab for engaging within at least one opening in the string bed.

Specifically, the biasing arrangement includes a tightening element, a receiving element having a threaded opening and a threaded shaft connected to the tightening element, with the tightening element located on a side of the string bed opposite the force measuring device, the receiving element located on an opposite side of the string bed and connected to the force measuring device, and the threaded shaft extending through the string bed for threaded receipt in the threaded opening of the receiving element in order to deflect the string bed upon rotation of the tightening element and causing said force measuring device to output a signal corresponding to the stiffness of the string bed, wherein said stop is positioned in said receiving element at a position such that contact of the stop by a free end of the threaded shaft sets a predetermined deflection of the string bed.

The above and other features of the invention will become readily apparent from the following detailed description thereof which is to be read in connection with the accompanying drawings.

BRIEF DESCRIPTION OF THE DRAWINGS

FIG. 10 is a perspective view of the strain gauge mount, strain gauges and threaded rod;

FIG. 11 is a bottom plan view of the strain gauge mount, strain gauges and threaded rod;

FIG. 12 is a side elevational view of the strain gauge mount, strain gauges and threaded rod;

FIG. 13 is a top plan view of the strain gauge mount, strain gauges and threaded rod;

FIG. 15A is an enlarged side cross-sectional view of FIG. 15, with the string bed in a unbiased state;

FIG. 38 is partial cross-sectional view of another embodiment of the present invention; and FIG. 39 is an enlarged portion of the embodiment of FIG. 38.

DETAILED DESCRIPTION

Figure 1:
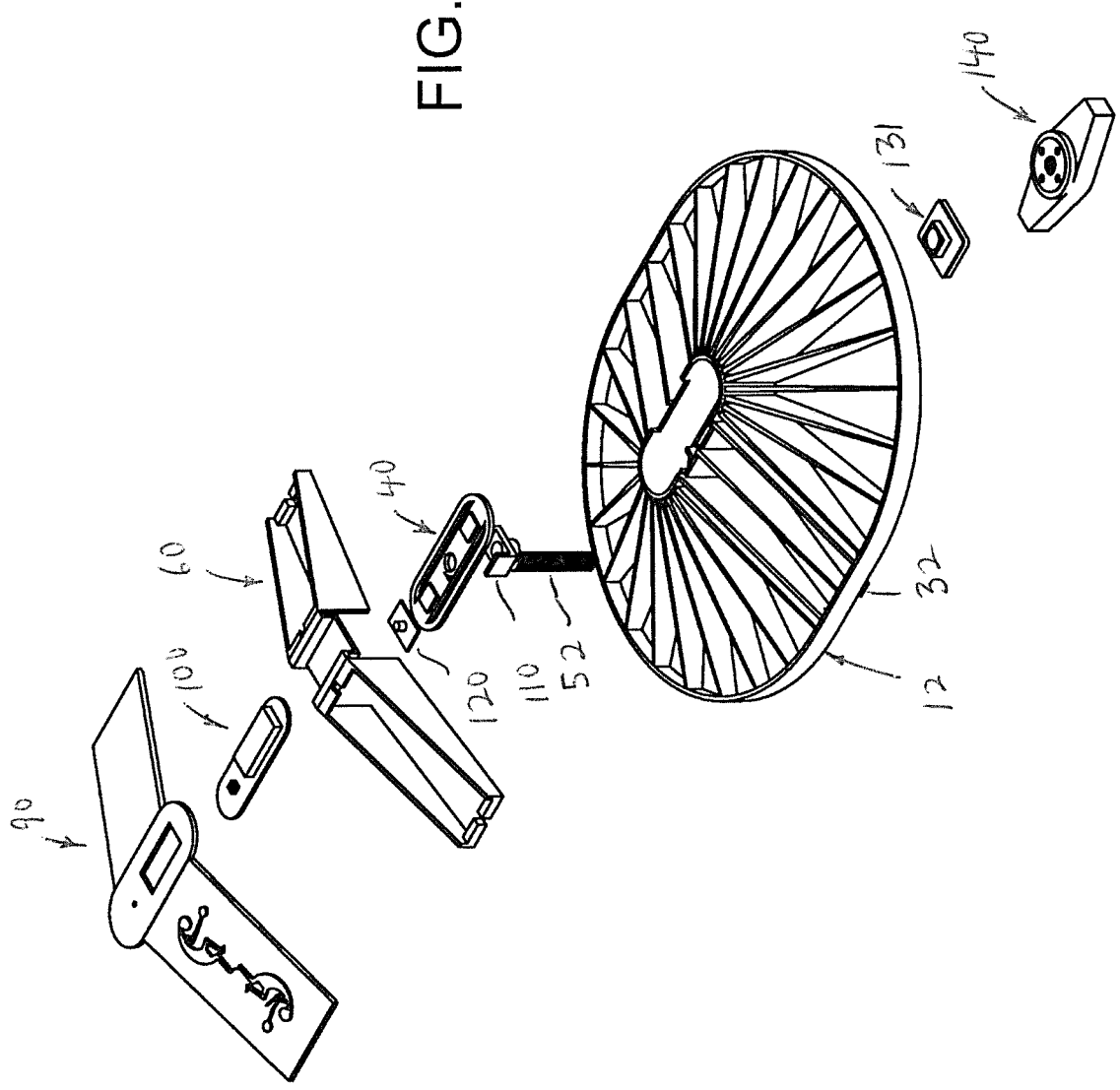
FIG. 1 is an exploded perspective view of a device for measuring string bed stiffness of strings of a racket according to a first embodiment of the present invention.
Figure 2:
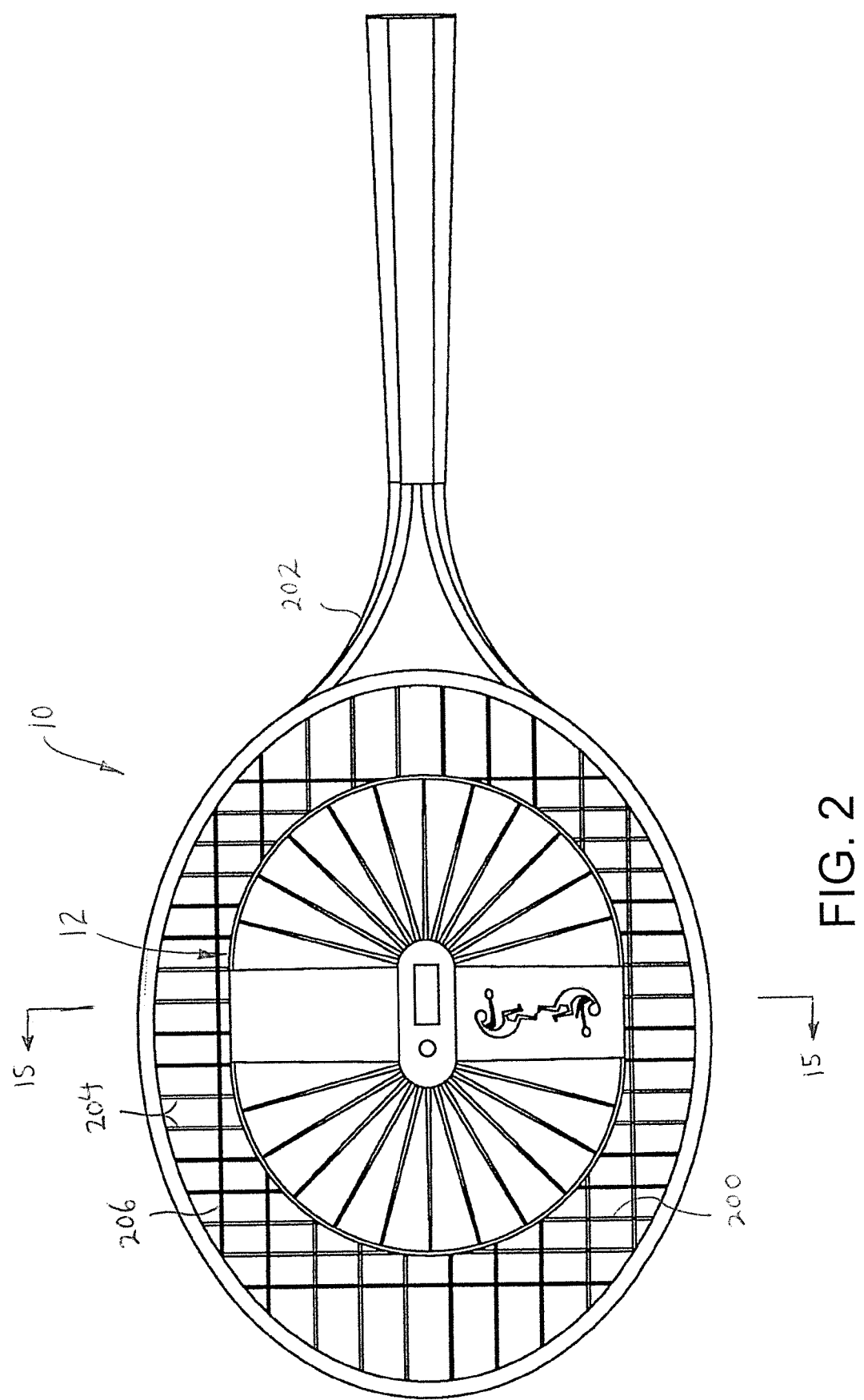
FIG. 2 is a top plan view of the device of FIG. 1, in an assembled condition with a tennis racket.

Referring to the drawings in detail, and initially to FIG. 1, there is shown a measuring device 10 for measuring string bed stiffness in the strings of a racket, and in particular, a tennis racket.

As shown best in FIGS. 1 and 5-9, measuring device 10 includes a main body 12 having a generally oval or elliptical shape. Main body 12 is preferably made of a plastic material, such as an ABS plastic. Other plastics, such as polyethylene terephthalate (PETE or PET), polyethylene (PE), polyvinyl chloride (PVC), polypropylene (PP), polystyrene (PS), polylactic acid (PLA), polycarbonate (PC) and others known in the art, can be used as well. The plastics may be reinforced with other materials, for example, carbon fiber. For the purpose of the present invention, reference to plastic includes all generally known materials which fall under the term plastics and reinforced plastics.

Figure 15:
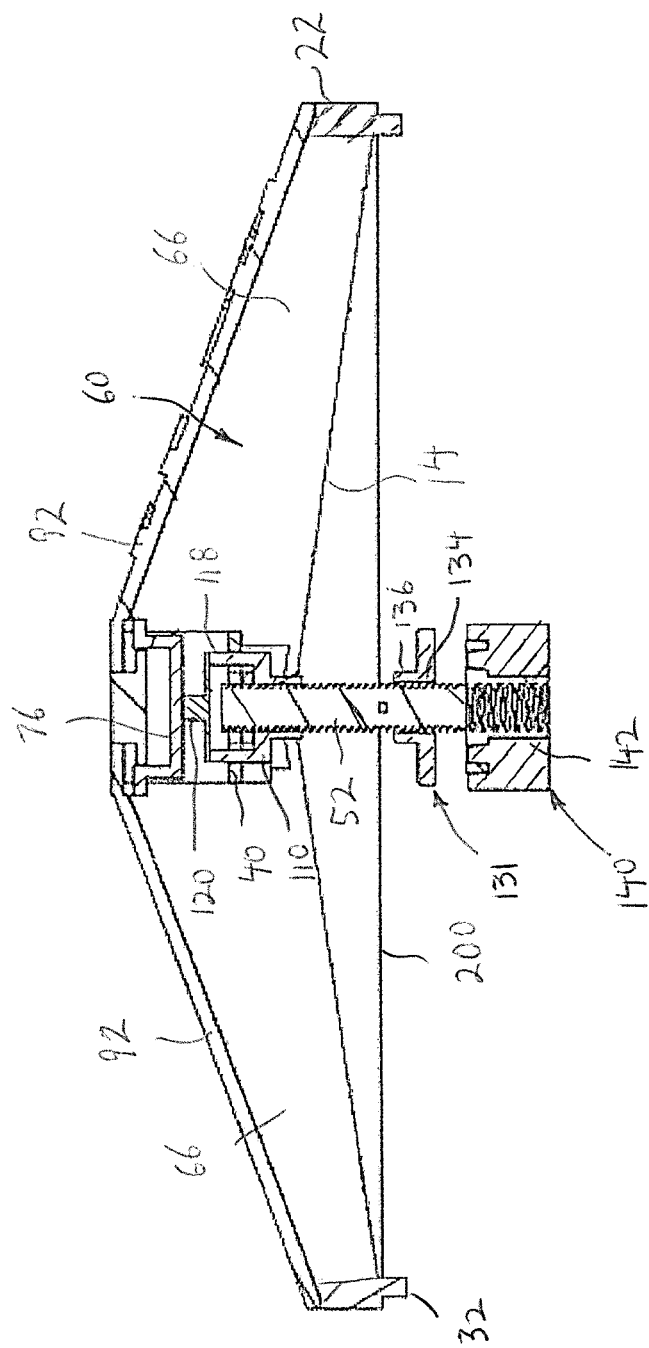
FIG. 15 is a side cross-sectional view of FIG. 2, taken along line 15-15 thereof, with the string bed in an unbiased state.
Figure 16A:
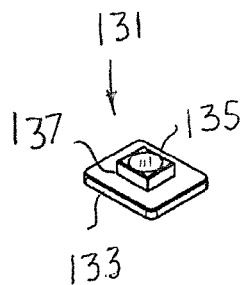
FIG. 16A is a perspective view of the pushing body.
Figure 16B:
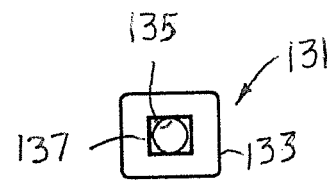
FIG. 16B is a top plan view of the pushing body.
Figure 16C:
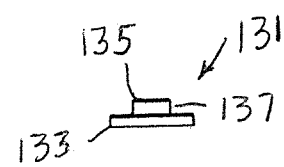
FIG. 16C is a side elevational view of the pushing body.
Figure 17A:
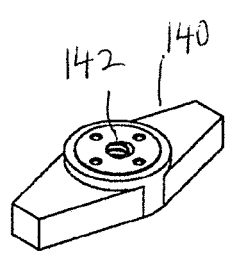
FIG. 17A is a perspective view of the knob.
Figure 17B:
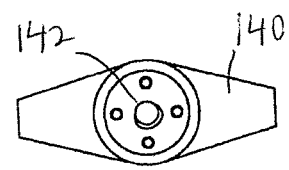
FIG. 17B is a top plan view of the knob.
Figure 17C:
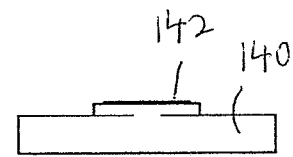
FIG. 17C is a side elevational view of the knob.

Main body 12 includes a bottom wall or pan 14 of a generally oval or elliptical shape, with a central opening 16 therethrough. Bottom wall 14 inclines from each point on the outer periphery toward the center thereof, as best shown in FIG. 15. A generally oblong central raised wall 18 extends upwardly from bottom wall 14 in centered, surrounding relation to central opening 16. One longer upper edge of central raised wall 18 is formed with a cut-out or recess 20 therein. A shorter outer raised peripheral wall 22 extends upwardly from the outer periphery of bottom wall 14. A plurality of radially extending stiffening ribs 24 are positioned on bottom wall 14 and extend and are connected between central raised wall 18 and outer raised wall 22. The preferred embodiment includes a draft to the thickness of each rib from the bottom wall to the central raised wall, which draft is preferably 0.5 to 2%. Finite Element Analysis (FEA) shows a good distribution of force when the draft is included. The draft also reduces the material used to make the main body.

It will be appreciated that, because outer raised peripheral wall 22 is shorter than central raised wall 18, stiffening ribs 24 increase gradually in height from outer raised peripheral wall 22 to central raised wall 18. However, it will be understand that, even with the provision of stiffening ribs 24, main body 12 will still exhibit deflection during use and mechanical creep over repeated use.

In addition, main body 12 includes downwardly turned locator tabs 32 fixed with outer raised peripheral wall 22.

The number and positioning of tabs 32 on outer raised peripheral wall 22 can vary. In a preferred embodiment, there are three such tabs 32, two diametrically opposite on longer sides of outer raised peripheral wall 22 and one on a shorter side of outer raised peripheral wall 22. Locator tabs 32 are inserted into the string bed 200, that is, between the cross strings 204 and main strings 206.

In this regard, it is important that the measurement occur at the same position on the string bed. If the device is at a different position on the string bed from one reading to another, the readings will be different. The location of the device on the string bed at the same location from one reading to another is required for repeatability and comparison. The aforementioned locator tabs 32 thereby provide a unique location system which is adaptable to different racket head sizes, shapes and string patterns, in order to preferably locate the "sweet spot" of each string bed. For example, it is known that most rackets have an even number of main strings extending in the lengthwise direction and between 16 and 20 cross strings extending in the transverse direction. The invention includes at least one and preferably three or four locator tabs 32. Tabs 32 are located 90° apart. The use of multiple locator tabs 32 whose positions may change takes the variation from racket to racket into account, in order to obtain a uniform reading each time.

To position the device, the tab 32 on one short side is placed above the cross string at the top or free end of the racket and in the middle of two middle main strings. The device is then slid away from the top cross string until the tabs 32 on the long sides fall between two cross strings. Alternatively, the tab 32 on one short side is placed above the cross string at the top or free end of the racket and in the middle of the main strings and between two main strings. Another tab 32 on the other short end is placed in the middle of the main strings and between two main strings closer to the handle of the racket. It will be appreciated that the reposition of the tabs allows the tab wall to rest against the perpendicular string running across the two strings in which the tab is placed between. This will more accurately position the string bed to the device.

It will therefore be appreciated that main body 12 is smaller than the string bed of a tennis racket. Because main body 12 is made of a plastic material, it is therefore inexpensive, easily portable and lightweight.

As will be understood from the discussion hereafter, during a measuring operation, main body 12 is deformed slightly and exhibits mechanical creep.

As best shown in FIGS. 1, 10-13 and 15, a strain gauge mount 40 is fixedly mounted on the upper edge of central raised wall 18, and has the same outer dimensions thereof. Specifically, strain gauge mount 40 includes a flat plate 42 having opposite outer sections 44 along the longer sides thereof which are separated from an inner section 46 by elongated openings 48, thereby permitting inner section 46 to deform relative to outer sections 44 under the presence of pressure applied thereto. Outer sections 44 seat upon and are fixed to the upper edge of central raised wall 18, by any suitable means, such as mechanical fit, plastic welding, adhesives, etc. In this regard, inner section 46 is provided with a central opening 50, and the upper end of a threaded rod 52 is fixed within central opening 50 and projects downwardly therefrom. When threaded rod 52 is pulled down, it applies a pressure to inner section 46, to cause it to deform relative to outer sections 44. In order to provide a measurement relative thereto, two strain gauges 54 are provided on the upper surface of inner section 46 on opposite sides of central opening 50 and between elongated openings 48. Strain gauges 54 convert the deflection of the inner section 46 relative to the outer sections 44 into a change of electrical resistance which can then be measured. Specifically, any physical strain in the material of inner section 46 is transmitted to the resistive element of strain gauges 54. This then experiences a proportional resistance change which in turn can be measured using appropriate circuitry, as is well known.

As best shown in FIGS. 1-3, 14 and 15, a stop 60 is mounted on top of main body 12 such that it is not affected by deformation of main body 12. Specifically, stop 60 includes first and second floating sections 62 connected together by a bridge 64 at inner ends thereof. Each floating section 62 (FIG. 14) includes two parallel, spaced apart trapezoidal shaped walls 66, having inwardly turned walls 68 at the radially outer ends thereof which face each other with a gap 70 therebetween. Each floating section 62 further includes two inwardly turned walls 72 at the upper portions of the radially inner ends thereof, with a gap 74 therebetween. Gaps 70 and 74 are provided to receive stiffening ribs 24 therein. However, inwardly turned wall 68 and 72 are not secured to stiffening ribs 24, that is, stiffening ribs 24 can move within gaps 70 and 74.

Bridge 64 is formed generally as a U-shaped member with a central wall 76 in parallel spaced apart relation to the bottom edges of trapezoidal shaped walls 66, and two parallel end walls 78 upwardly extending from opposite edges of central wall 76. Further, a ledge 80 extends outwardly from the upper edges of each end wall 78 and is fixed to inwardly turned walls 72.

Stop 60 is fixed to main body 12 only at inwardly turned walls 68 at the radially outer ends thereof. Specifically, inwardly turned wall 68 are fixed to bottom wall 14 and/or outer raised peripheral wall 22. Because of this arrangement, when a force is applied to main body 12, whereby main body 12 may deform slightly, stop 60, because it is only secured at its outer ends to main body 12, does not deform, the reason for which will become apparent from the discussion hereafter. In other words, stop 60 does not see the force on main body 12 caused by deflection of the strings.

A cover 90 is secured on top of stop 60 and includes first and second elongated rectangular plates 92 connected together by a bridge plate 94. Rectangular plates 92 cover upper open ends of floating sections 62 of stop 60, and bridge plate 94 extends over bridge 64. Bridge plate 94 includes an opening 96 having a transparent piece of plastic or glass 98 therein.

Figure 3:
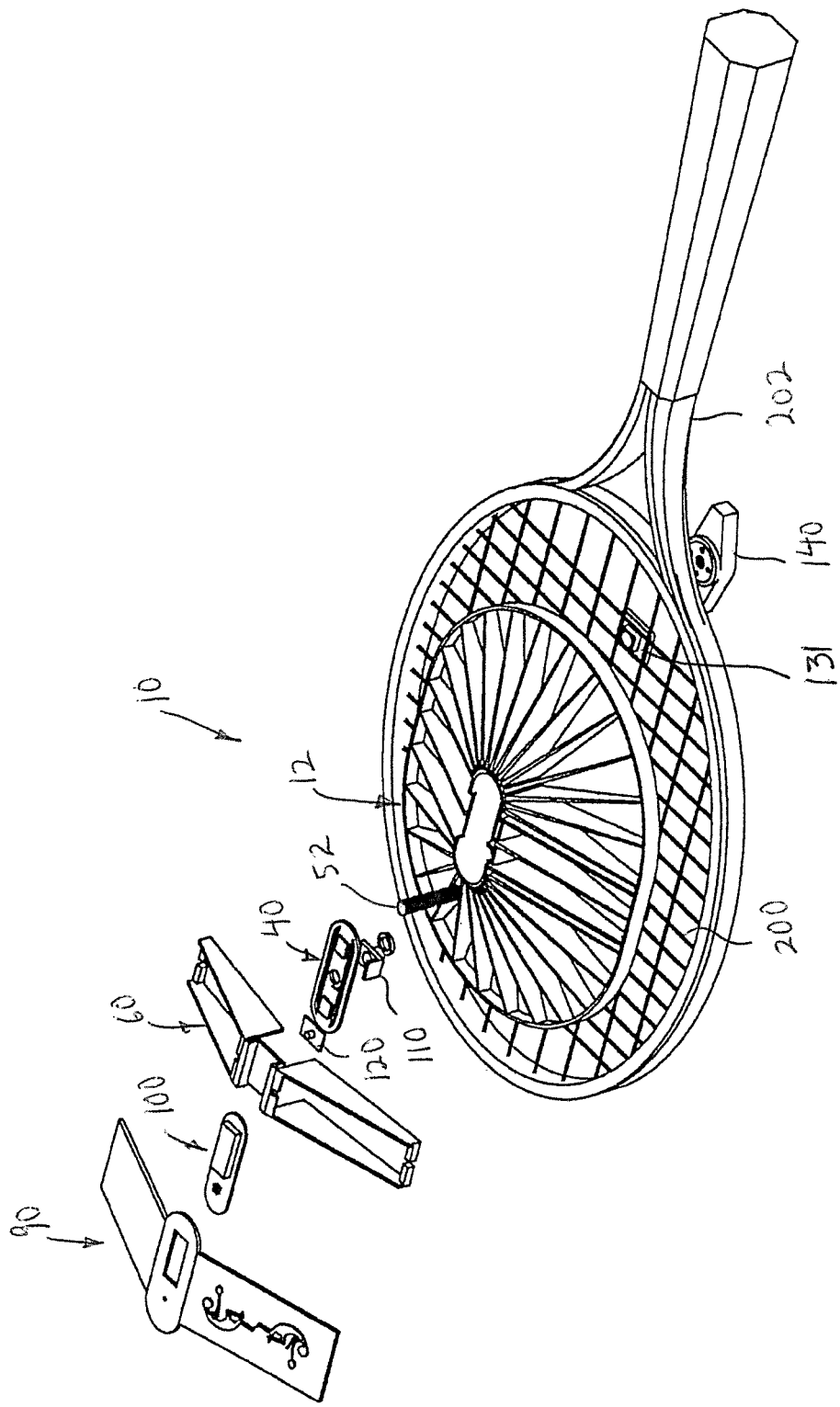
FIG. 3 is an exploded perspective view of the arrangement of FIG. 2, in relation to a tennis racket.
Figure 4:
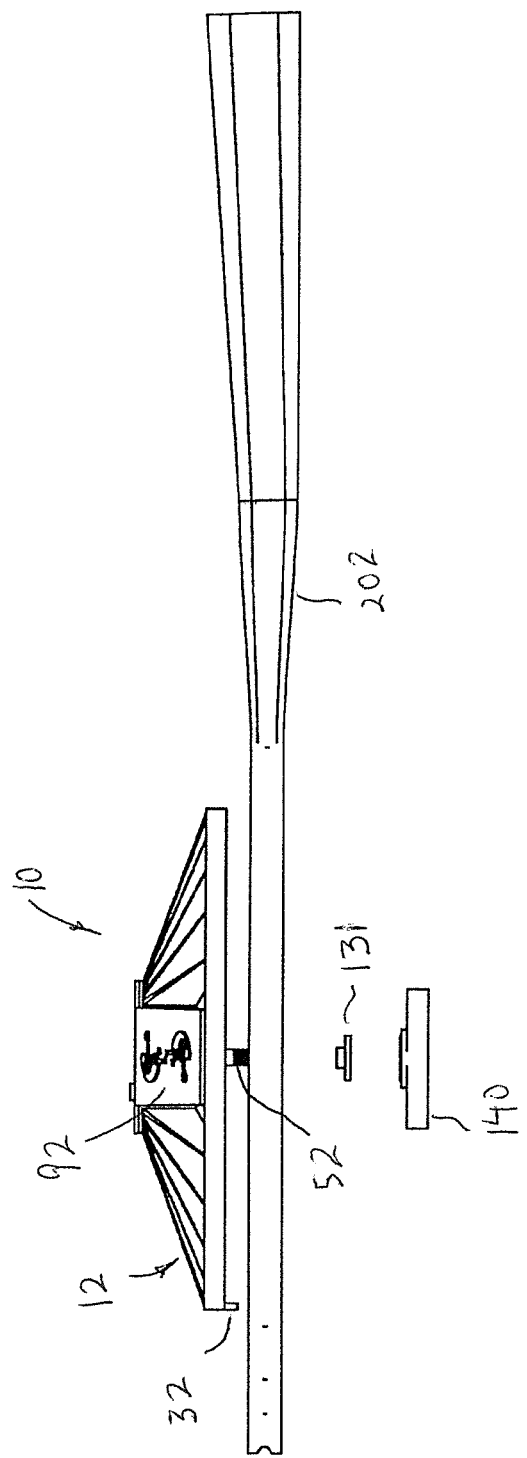
FIG. 4 is a side elevational view of the arrangement of FIG. 2, in a partially exploded view.
Figure 5:
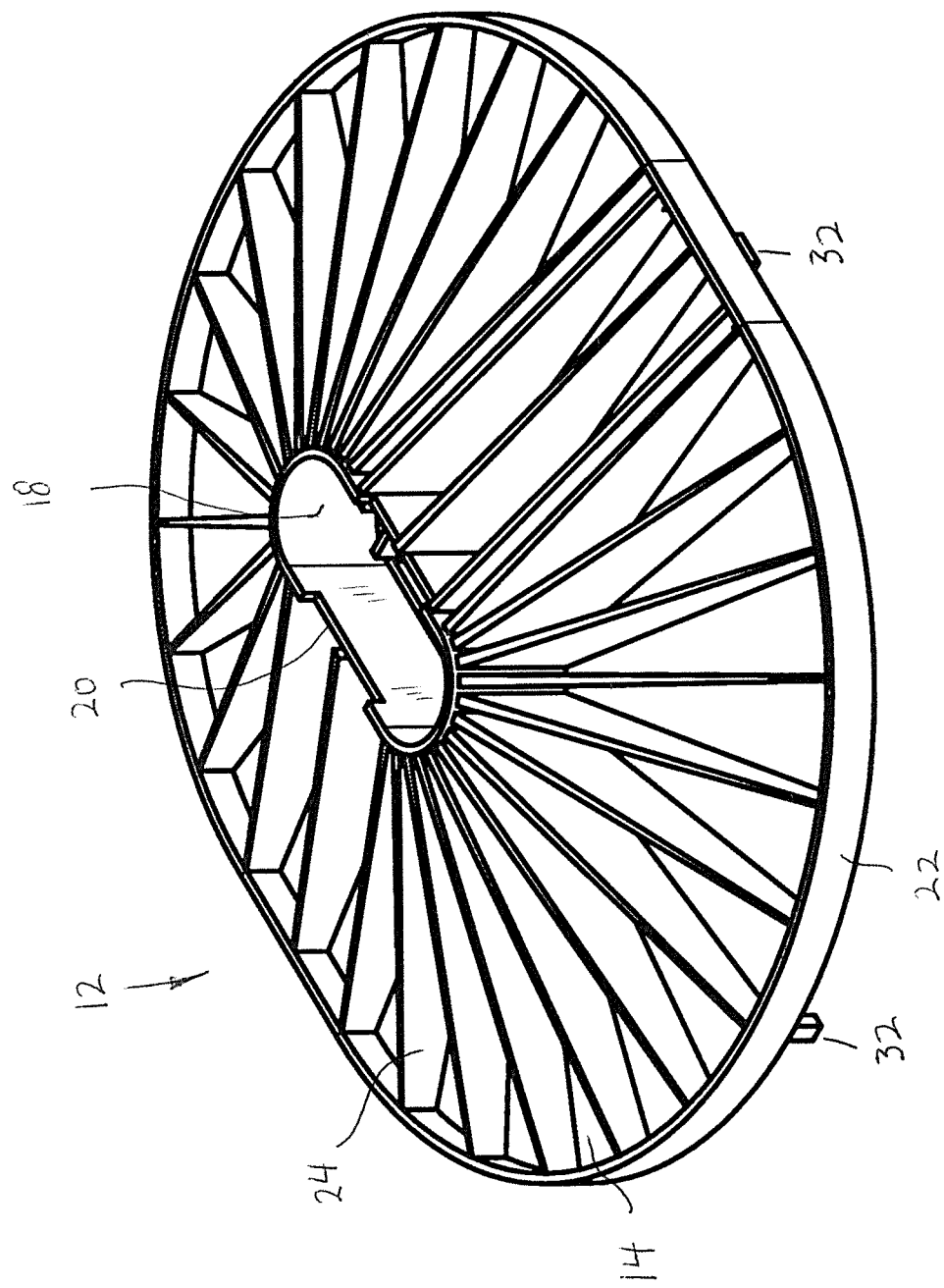
FIG. 5 is a top perspective view of the main body of the device.
Figure 6:
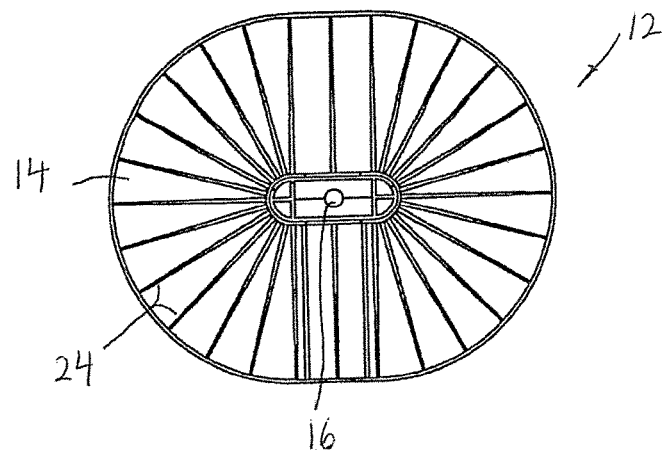
FIG. 6 is a top plan view of the main body.
Figure 7:
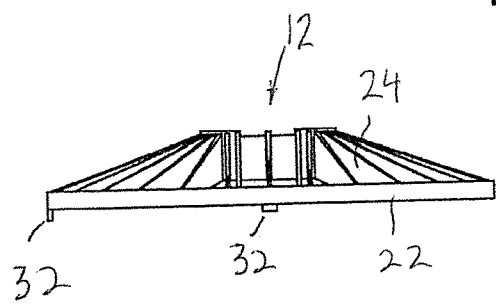
FIG. 7 is a side elevational view of the main body.
Figure 8:
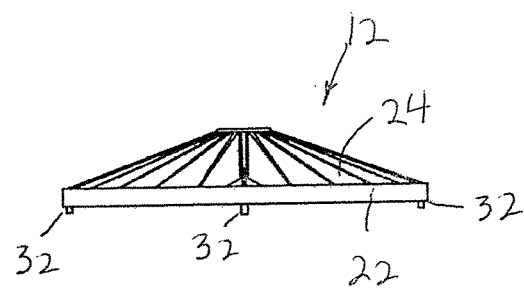
FIG. 8 is an end elevational view of the main body.
Figure 9:
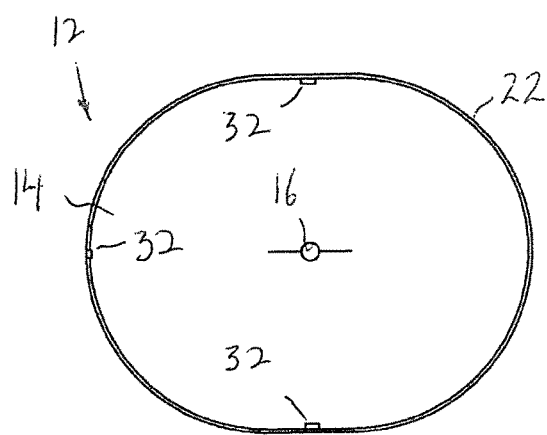
FIG. 9 is a bottom plan view of the main body.
Figure 14:
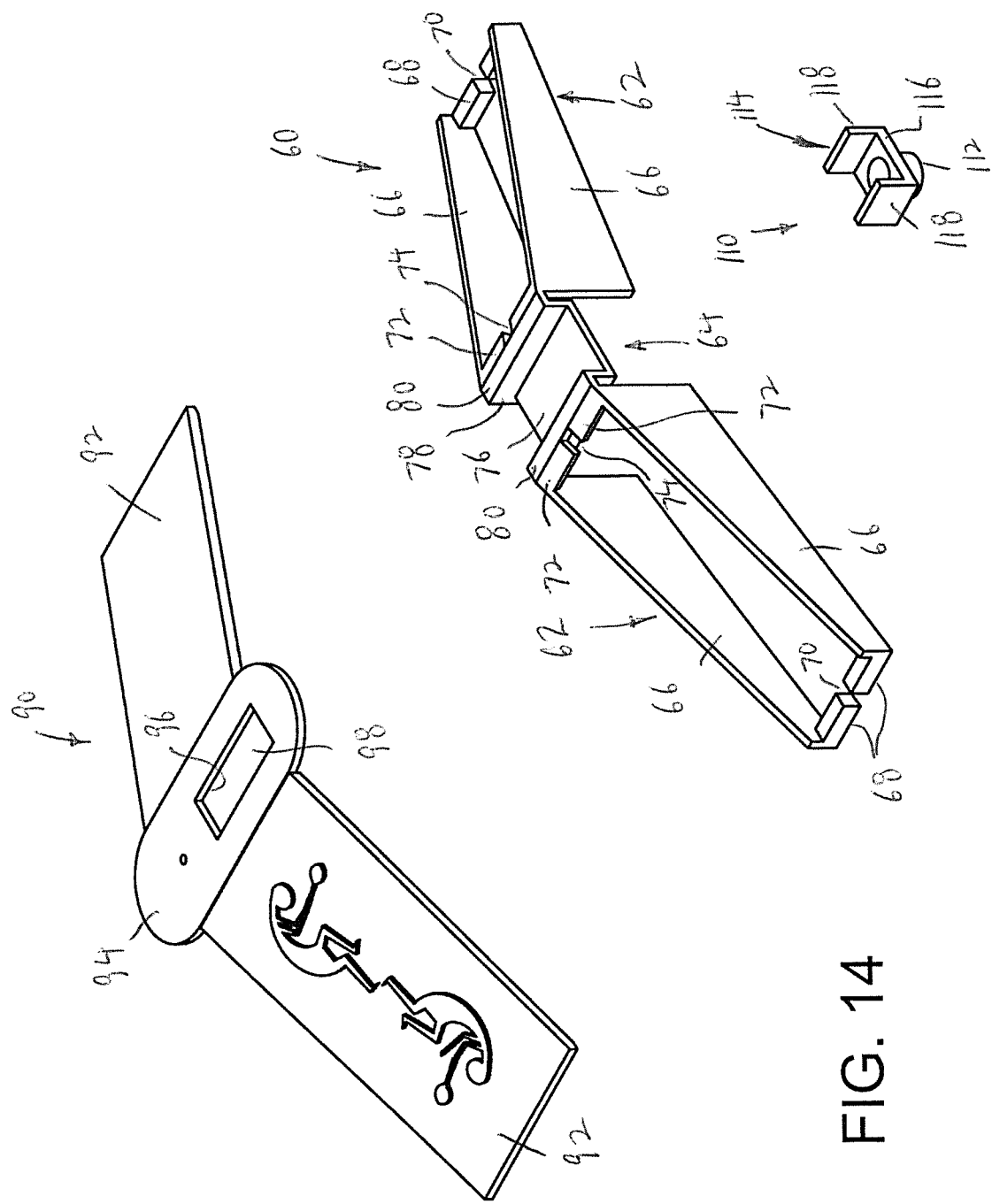
FIG. 14 is a perspective view of the stop, cover and connection pusher.
Figure 18:
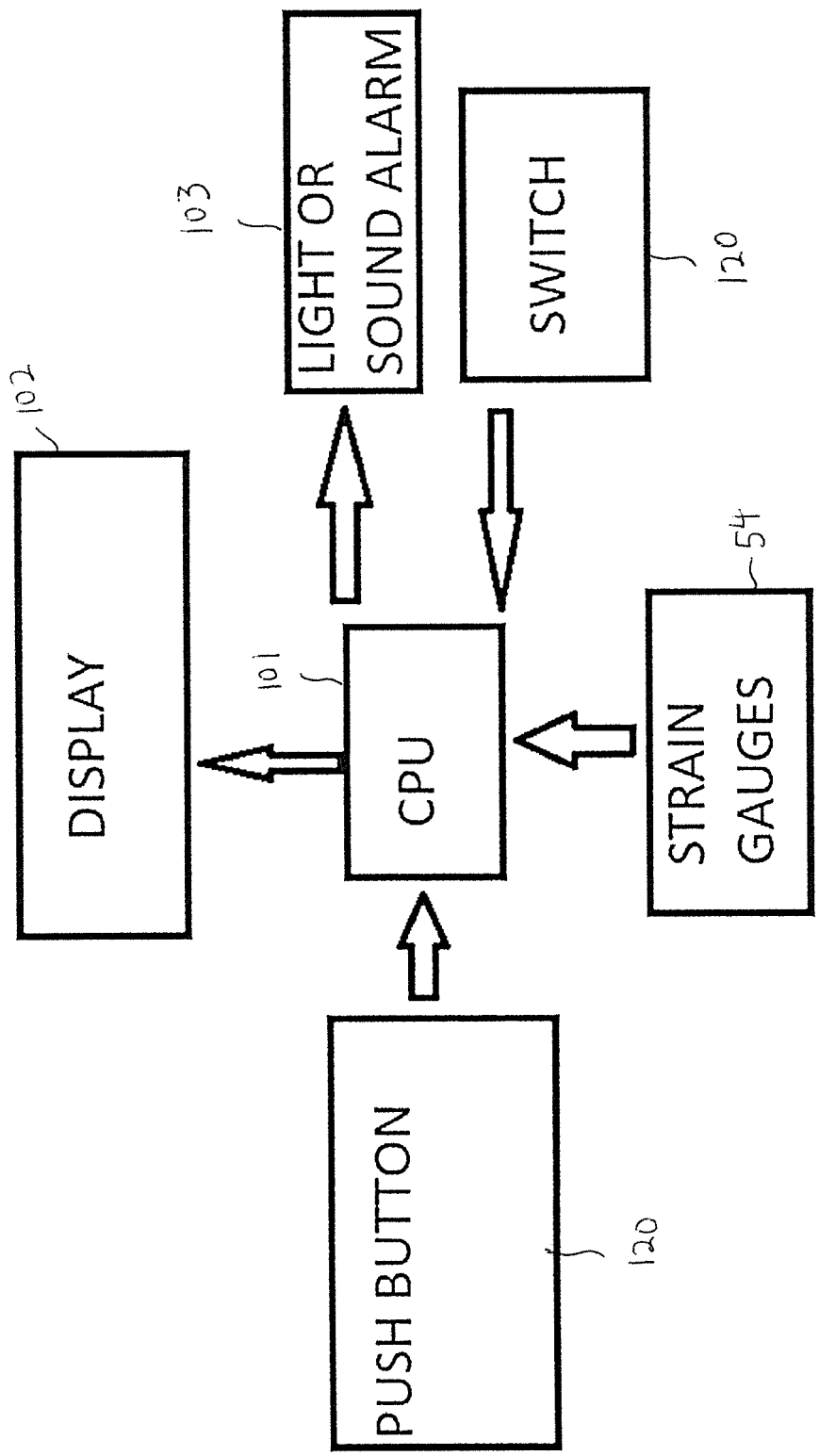
FIG. 18 is a schematic drawing of the electronics.
Figure 19:
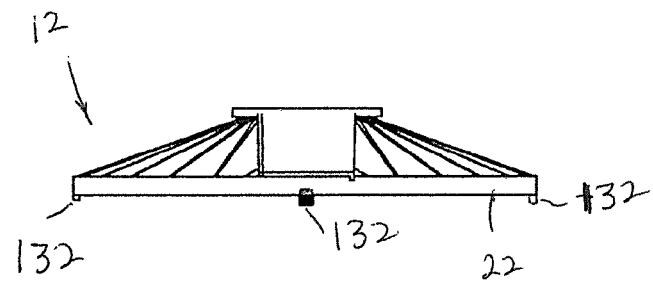
FIG. 19 is a side elevational view of the main body with adjustment slides having alternative locator tabs.
Figure 20:
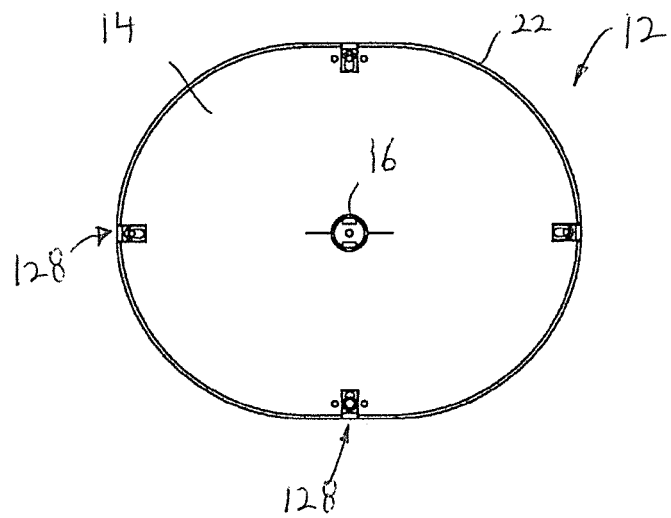
FIG. 20 is a bottom plan view of the main body of FIG. 19.
Figure 21:
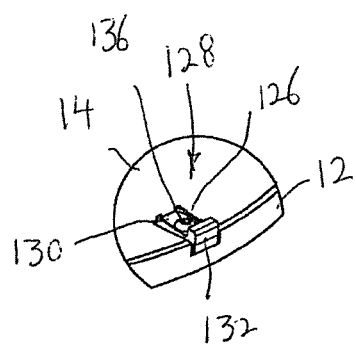
FIG. 21 is a bottom perspective view of one adjustment slide with the alternative locator tab.
Figure 22:
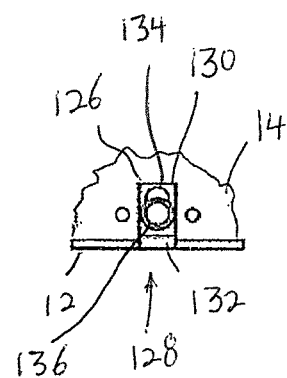
FIG. 22 is a bottom plan view of the adjustment slide of FIG. 21.

As shown best in FIGS. 1, 3 and 18, a printed circuit board 100 is provided having a central processing unit (CPU) 101, which is connected to a display 102 on printed circuit board 100. Printed circuit board 100 is mounted to central wall 76 of bridge 64 or central raised wall 18 of main body 12, such that display 102 is viewable through the transparent piece of plastic or glass 98. CPU 101 is connected by wires (not shown) to strain gauges 54 to receive electrical signals therefrom, and determine the force applied to the strings, and display this value on display 102. In addition, CPU 101 can be connected to an audio or visual indicator 103, such as a light, beeper, buzzer, etc. Additionally, as will be described hereafter, a switch giving the CPU a change in an electrical circuit when the string bed is deflected a predetermined amount can be included.

When measuring the string bed stiffness by strain gauges 54, it is important to reproduce the exact conditions during each measurement. In this regard, it is important that measurement occur during the same amount of deflection of the string bed for each measurement. However, because main body 12 is made of a plastic material, there is deformation during use and mechanical creep over time that occurs, thereby varying the conditions during multiple measurements.

For this reason, stop 60 is provided which, because it is only connected at its ends to main body 12, does not move or deform during measurement of the string bed bias, that is, which is independent of the string deformation and any deformation or mechanical creep of main body 12.

In this regard, as best shown in FIGS. 1, 3, 14 and 15, a connection pusher 110 is provided. Specifically, connection pusher 110 includes a lower member 112 that is slidably received on threaded rod 52 below strain gauge mount 40. Connection pusher 110 further includes a U-shaped member 114 with a central wall 116 positioned below inner section 46 of strain gauge mount 40, and two parallel arms 118 upwardly extending from opposite edges of central wall 116. Arms 116 extend through elongated openings 48 in strain gauge mount 40 for sliding movement therethrough.

A switch 120 is mounted to the upper ends of arms 118 as they extend out of elongated openings 48, that is, above strain gauge mount 40. Alternatively, as will be understood from the discussion hereafter, switch 120 can be mounted to the underside of bridge 64 or other location which may be activated by the movement of the string bed. For the purpose of this invention, a switch is a device for making, breaking, or changing the connections in an electrical circuit. Regardless of the location of the switch, the change in connection of the electrical circuit occurs as the biasing arrangement moves the string bed the predetermined amount.

When the string bed 200 of the racket 202 is forced upwardly, as will be described hereafter, as best shown in FIG. 15A, the lower end of lower member 112 of connection pusher 110, which rests on the side of the string bed between the string bed and stop, is forced upwardly along with the string bed. The outer peripheral wall 22 of main body 12 also rests on the side of the string bed between the string bed and the stop. As a result, the predetermined position will be set regardless of the string gauge thickness, notching or fraying of the strings or other influence to the string bed thickness. As a result, as will be understood from the discussion hereafter, arms 118 of connection pusher 110 travel upwardly through elongated openings 48, and switch 120 travels upwardly with arms 118. When switch 120 abuts against the lower surface of central wall 76 of bridge 64, the string bed 200 has been deflected by a predetermined amount, for example, 10 mm. At this time, display 102 will display a message HOLD, which indicates to the user that the string bed has been deflected by 10 mm.

During this deflection of the string bed, inner section 46 of strain gauge mount 40 will move downwardly relative to outer sections 44 thereof. As a result, strain gauges 54 send a signal to printed circuit board 100, which determines the string bed stiffness therefrom and displays the same on display 102.

It will be appreciated that this occurs, irrespective of any deformation or creep of main body 12, because stop 60 does not deform or move during such operation. As a result, a consistent and uniform amount of deformation occurs during each measurement, in order to achieve an accurate reading of the string bed stiffness.

In order to deform the string bed 200 and push the strings upwardly, a pushing body 131 is slidably threadedly received on the lower end of threaded rod 52 below the string bed 200. As shown in FIGS. 1, 4, 15A and 16A-16C, pushing body 131 includes a generally square plate 133 having a central cylindrical opening 135 therein, and a square cylindrical boss 137 extending upwardly from cylindrical plate 133 in surrounding relation to central opening 135. Cylindrical boss 137 has outer dimensions that permit it to extend through the string bed 200, that is between four strings, namely, two cross strings 204 and two main strings 206, while cylindrical plate 133 has outer dimensions that prevent it from extending through the string bed 200. Testing has shown that the most accurate repeatable measurements include a pushing body engaging only four strings in the same repeatable opening of the string bed.

A knob 140 having an acme nut 142 centrally therein, is provided, with acme nut 142 having internal threads 143 (shown best in FIG. 15A) and threaded onto the lower end of threaded rod 52. It is noted that acme nuts 142 are generally stronger than nuts having V-shaped threads, making them better for power transmission and carrying loads. Preferably, nut 142 is a self-locking nut. For example, nut 142 can have acme threads with a 2 mm pitch and four lead start. As nut 142 is threaded onto threaded rod 52, it abuts against the lower surface of square plate 133, thereby forcing the string bed 200 to deflect upwardly. At the same time, inner section 46 of strain gauge mount 40 is deflected downwardly by a pulling action of threaded rod 52, whereby strain gauges 54 will send an electrical signal corresponding to the string bed stiffness to CPU 101 of printed circuit board 100 which will determine string bed stiffness and display this value on display 102. A light or sound may also be produced at this time by audio or visual indicator 103.

Nut 142 will be rotated until square plate 133 abuts the lower end of the strings which push the connection pusher 110, which is above the strings, and which is moved upwardly therewith, until switch 120 is pushed against the lower surface of bridge 64. This corresponds to a deflection of the string bed by a fixed amount, for example, 10 mm. Switch 120 then sends a signal to printed circuit board 100 to indicate that the deflection of 10 mm has occurred. Because stop 60 does not move during the above operation, since it is only connected to main body 12 at its ends, the 10 mm measurement of deflection is an accurate measurement each time, regardless of deformation or mechanical creep of main body 12.

However, nut 142 may be over-rotated. Further, when a material is stressed, it takes some time for the deformation to fully settle, that is, this does not occur instantaneously. For this reason, a period of time is provided for stabilization to occur with respect to strain gauge mount 40 and the pressure on the strings. Then, nut 142 is slowly released by rotating the same counterclockwise. At the point where switch 120 changes the state of the electrical circuit, this is the accurate 10 mm deflection of the strings. An audio or visual indicator 103, such as a light, beeper or buzzer, may alternatively be used at this point when there is a determination that the average signal from the strain gauge has been unchanged for a period of time, indicating the rest position. Measurement by strain gauges 54 is calculated by CPU 101 from the strain gauges output when the switch 120 changes the state of the electrical circuit as the nut 142 is moved counterclockwise to the point in which there is no pressure on the strings, that is, where nut 142 is removed, and the material of the deformed strain gauge has settled and the change in output is stabilized.

It will be appreciated that, with the present invention, although there may be some deformation or mechanical creep of main body 12, an accurate deflection of 10 mm occurs during each measurement because stop 60 is only connected at its ends to main body 12 and does not deform or deflect during the measurement operation. As a result, an accurate reading of the string bed stiffness occurs during each measurement.

It will be appreciated that various modifications can be made to the present invention, within the scope of the claims.

For example, FIGS. 19-22 show an alternative embodiment for the locator tabs. Specifically, a recess 126 extends inwardly through outer raised peripheral wall 22 and bottom wall 14 at the center of one, two, three or four sides of main body 12. An adjustment slide 128 is slidably positioned within each recess 126. Specifically, adjustment slide 128 includes a slide wall 130 slidably received within each recess 126, and having a downwardly turned locator tab 132 at the outer free end thereof. Slide wall 130 includes an elongated opening 134 through which a fixing screw 136 extends. Fixing screw 136 is secured to main body 12, by screwing it into the main body 12. When the fixing screw 136 is loosened, it allows the adjustment slide 128 to be pulled outwardly of the main body 12 by locator tab 132. If one tightens the fixing screw 136, the slide wall 130 is fixed to the main body. In this manner, adjustment slides 128 can be pulled outwardly to more accurately engage with the string bed of the tennis racket, in order to best center main body 12 on the string bed of the tennis racket. In such case, locator tabs 132 are inserted into the string bed, that is, between the cross strings 204 and main strings 206.

Figure 23:
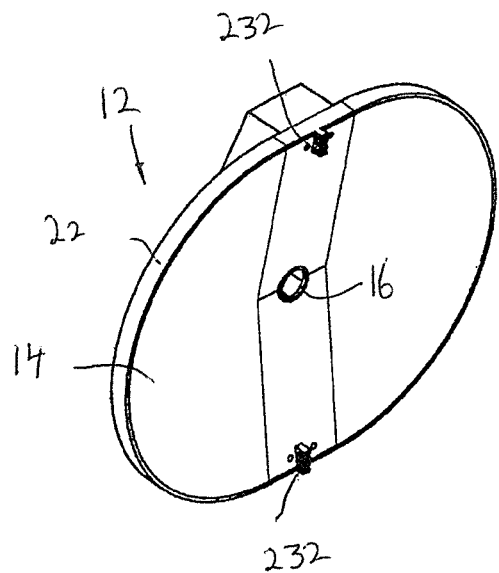
FIG. 23 is a bottom perspective view showing the main body having another embodiment of locator tabs.
Figure 24:
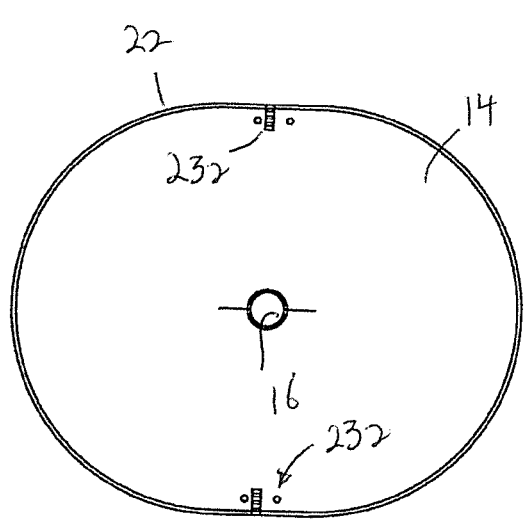
FIG. 24 is a bottom plan view of the main body of FIG. 23.
Figure 25:
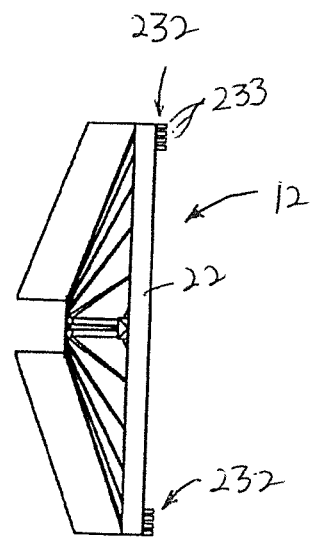
FIG. 25 is a side elevational view of the main body of FIG. 23.

Another modification for the locator tabs is shown in FIGS. 23-25. Specifically, locator tabs 232 are fixed to bottom wall 14. However, rather than a single locator tab as with locator tab 32 of the first embodiment, locator tab 32 includes a plurality of spaced apart tines 233, to receive a string between any two tines 233.

Figure 26:
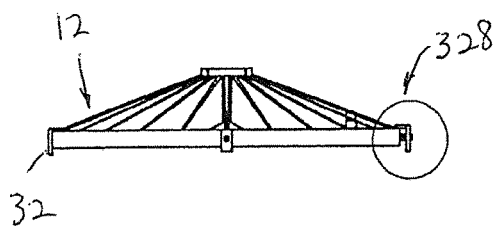
FIG. 26 is a side elevational view showing the main body having another embodiment of locator tabs.
Figure 27A:
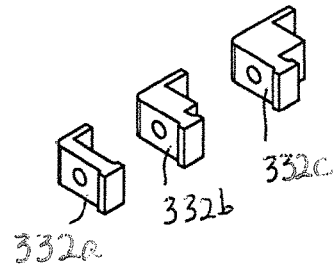
FIG. 27A is a perspective view of different thickness tabs that can be used.
Figure 27:
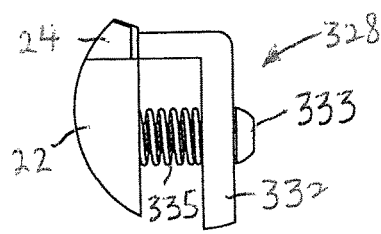
FIG. 27 is an enlarged side elevational view of a portion of the main body of FIG. 26 showing a locator.

A further modification of the locator tabs is shown in FIGS. 26 and 27. Specifically, an L-shaped adjustment slide 328 includes a downwardly turned locator tab 332 at the outer free end thereof. A rod 333 slidably extends through outer raised peripheral wall 22 and is connected at one end to locator tab 332, allowing locator tab 332 to move inwardly toward and outwardly of with respect to outer raised peripheral wall 22. A spring 335 receives rod 333 therethrough, with one end connected to outer raised peripheral wall 22 and the opposite end connected to locator tab 332. As a result, spring 335 functions to bias locator tab 332 inwardly towards outer raised peripheral wall 22. In operation, a user merely pulls on tab 332 and inserts tab 332 between the strings. When the entire operation is completed, locator tab 332 is removed from the strings, whereupon spring 335 pulls it back toward outer raised peripheral wall 22. It will be appreciated that the rod 333 may be replaced with a screw which is screwed into the raised peripheral wall 22 and slidably extends though the downwardly turned locator tab 332. Turning the screw clockwise and counterclockwise will move and fix the tab in relation to the raised peripheral wall 22 and the main strings of the string bed. Other modifications to move the tabs are possible so that it is possible that they locate the device on the string bed.

It will be appreciated that only one adjustment slide 328 is shown in FIGS. 26 and 27, with the remaining tabs corresponding to tabs 32 of the first embodiment. However, more than one adjustment slide 328 can be provided. It will be appreciated that the tabs and body holding each tab to the main body 12 may be completely replaced by, for example, unscrewing one tab and the body holding the tab from the main body 12, and replacing it with a thicker or thinner tab 332a, 332b or 332c (FIG. 27A) or body holding the tab. The purpose of moving the tab or changing the tab is to reposition the tab 32 with respect to the raised peripheral wall 22. The repositioning of the tab 32 enables the tab 32 to accurately engage with the string bed in order to accurately and repeatedly position the main body 12 on the string bed.

Figure 27B:
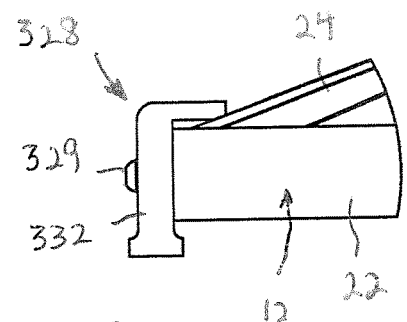
FIG. 27B is a side elevational view of one thickness of tabs shown in FIG. 27A.

Of course, as shown in FIG. 27B, L-shaped adjustment slide 328 can be fixed by a screw 329 to main body 12, and in such case, can be replaced with a different having with a thicker or thinner tab 332a, 332b or 332c.

Figure 28:
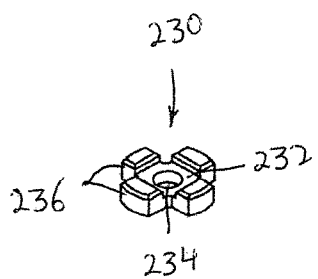
FIG. 28 is a perspective view of another embodiment of a pushing body.
Figure 29:
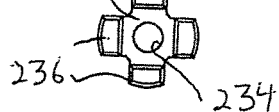
FIG. 29 is a top plan view of the pushing body of FIG. 28.
Figure 30:
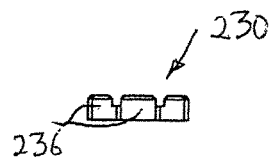
FIG. 30 is a side elevational plan view of the pushing body of FIG. 28.
Figure 34:
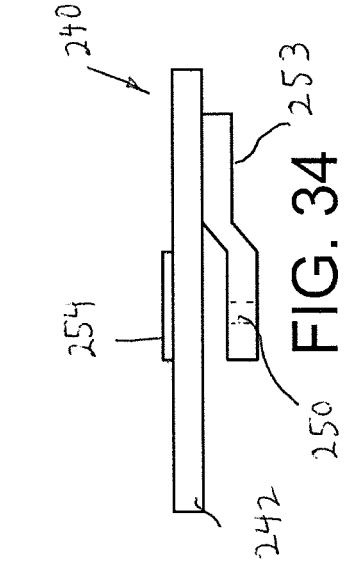
FIG. 34 is a side elevational view of the cantilevered strain gauge mount and strain gauge of FIG. 31.
Figure 31:
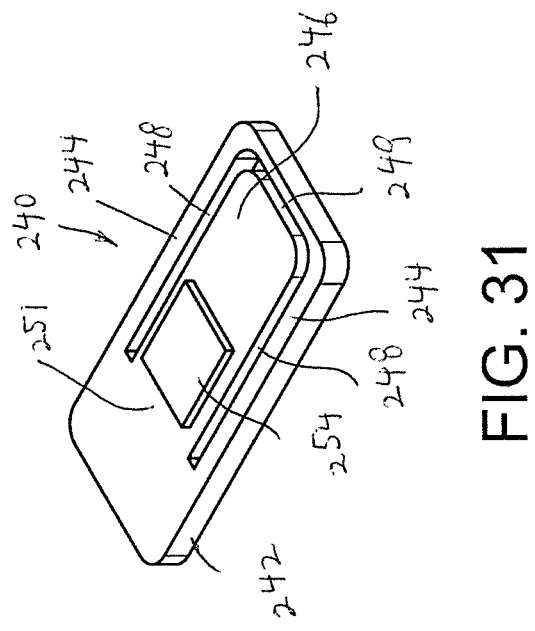
FIG. 31 is a perspective view of a cantilevered strain gauge mount and strain gauge.
Figure 33:
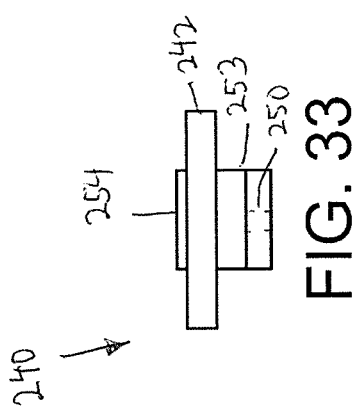
FIG. 33 is an end elevational view of the cantilevered strain gauge mount and strain gauge of FIG. 31.
Figure 32:
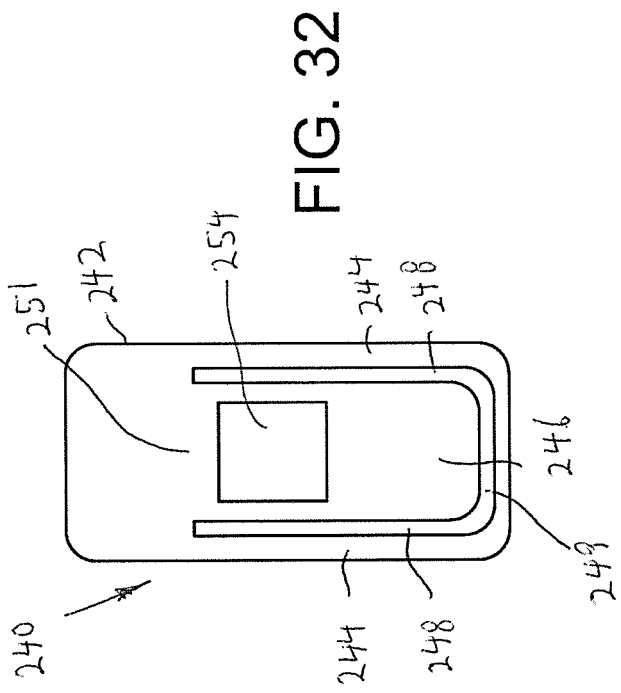
FIG. 32 is a top plan view of the cantilevered strain gauge mount and strain gauge of FIG. 31.
Figure 37:
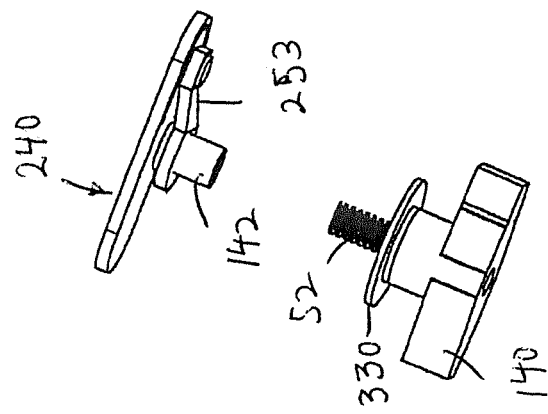
FIG. 37 is further side perspective view of the knob and strain gauge arrangement of FIG. 35.
Figure 35:
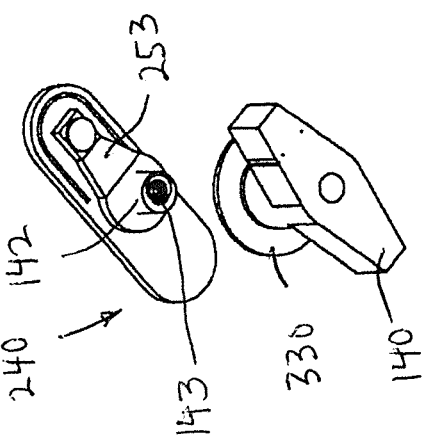
FIG. 35 is bottom perspective view of a knob and strain gauge arrangement according to another embodiment of the present invention.
Figure 36:
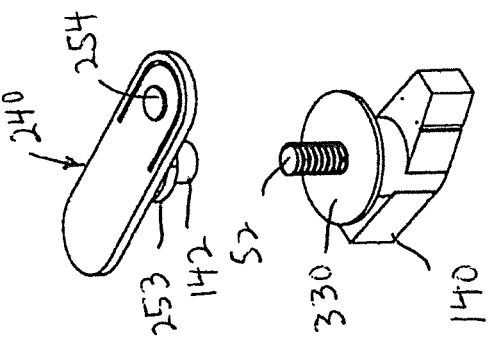
FIG. 36 is top perspective view of the knob and strain gauge arrangement of FIG. 35.

As a further modification, pushing body 131 can be replaced with a different pushing body 230 shown in FIGS. 28-30. Specifically, pushing body 230 includes a generally square plate 232 having a central cylindrical opening 234 therein. Four square cylindrical bosses 236 extending outwardly from each side of square plate 232 and upwardly therefrom, each for engaging between four strings, namely, two cross strings 204 and two main strings 206.

As a still further modification, inner section 46 of strain gauge mount 40 can be connected in a cantilevered manner relative to outer sections 44. This alternative is shown in FIGS. 31-34.

Specifically, strain gauge mount 240 is fixedly mounted on the upper edge of central raised wall 18, and has the same outer dimensions thereof. Specifically, strain gauge mount 240 includes a flat plate 242 having opposite outer sections 244 along the longer sides thereof which are separated from an inner section 246 by elongated openings 248 along the longer sides and a transverse opening 249 connecting opposite ends of elongated openings 248. As a result, inner section 246 is cantilevered at one end 251 thereof opposite transverse opening 249. Cantilevered inner section 246 will be pulled downwardly and deform relative to outer sections 244 under the presence of pressure applied thereto. Outer sections 244 seat upon and are fixed to the upper edge of central raised wall 18, by any suitable means, such as plastic welding, adhesives, etc.

In this regard, a Z-shaped plate 253 is connected to the underside of the free end of cantilevered inner section 246. The free end portion of Z-shaped plate 253 includes an opening 250, and the upper end of threaded rod 52 is fixed within opening 250 and projects downwardly therefrom.

When threaded rod 52 is pulled down, it applies a pressure to inner section 246, to cause it to deform relative to outer sections 244. In order to provide a measurement relative thereto, a single strain gauge 254 is provided on the upper surface of inner section 246 and converts the force or pressure applied to inner section 246 into a change of electrical resistance which can then be measured. Specifically, any physical strain in the material of inner section 246 is transmitted to the resistive element of strain gauge 254. This then experiences a proportional resistance change which in turn can be measured using appropriate circuitry, as is well known.

With this modification, inner section 246 bends more easily relative to outer sections 244, and only one strain gauge 254 is necessary.

As a further modification, stop 60 can be eliminated in situations where any deflection of main body 12 is minimal at most. This arrangement is shown in FIGS. 35-39.

In this case, it will be appreciated that the acme nut is provided on the strain gauge mount and the threaded rod 52 connected fixedly to the knob 140.

Specifically, the acme nut 142 is fixed to the underside of Z-shaped plate 253. The threaded rod 52 is fixed to knob 140. In such case, the pushing body may take the form of a circular plate 330 resting on knob 140 and through which threaded rod 52 rotatably extends. In this embodiment, the switch is eliminated, and instead, a hard stop 257 is provided inside of acme nut 142, as shown best in FIGS. 38 and 39.

In such case, as knob 140 is rotated, threaded rod 52 is threaded within acme nut 142, and circular plate 330 pushes on the underside of the string bed 200. When the free end of threaded rod 52 abuts against stop 257 within acme nut 142, the desired deflection of string bed 200 has been achieved, for example, by an amount of 10 mm. It will be appreciated that this arrangement is not as accurate as the first embodiment of FIG. 1, but will be generally satisfactory in cases where any deflection of main body 12 is minimal at most.

Alternatively, as shown in FIG. 39, stop 257 can be replaced with switch 120, which can function in the same manner as described above with respect to the embodiment of FIG. 1.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A device for measuring stiffness of the string bed of a racket, comprising:
   a main body adapted to sit on the string bed, the main body including an outer peripheral portion;
   a force measuring device mounted to the main body;
   a biasing arrangement connected to the force measuring device and adapted to be connected to the string bed for deflecting the string bed in relation to the force measuring device, and causing said force measuring device to output a signal corresponding to the deflection of the string bed;
   a display for displaying the stiffness of the string bed in accordance with the signal output from the force measuring device;
   a stop connected to the main body in a manner such that the stop is not moved by the deflection of the string bed when deflected by the biasing arrangement and which limits the string bed to a predetermined amount of deflection by the biasing arrangement,
   wherein the stop is in contact with the main body only at the outer peripheral portion of the main body, so that the stop is not deflected due to the biasing of the string bed by the biasing arrangement.

2. A device for measuring stiffness of the string bed of a racket according to claim 1, wherein the main body is made of a plastic material.

3. A device for measuring stiffness of the string bed of a racket according to claim 1, further comprising:
   a switch which provides a change output when the string bed is deflected a predetermined distance by the biasing arrangement relative to the stop, and
   wherein the display displays the string bed stiffness in accordance with a change in the signal output from the force measuring device in response to a change of the output of the switch as the string bed moves from one of:
   a) a predetermined deflected position or
   b) a position past the predetermined deflected position to an undeflected neutral position.

4. A device for measuring stiffness of the string bed of a racket according to claim 3, further including one of an audio indicator and visual indicator for providing an indication, in response to an output of the switch, when the string bed has been deflected by at least the predetermined amount.

5. A device for measuring stiffness of the string bed of a racket according to claim 1, wherein said main body includes a positioning arrangement for repeatably positioning said main body on the string bed.

6. A device for measuring stiffness of the string bed of a racket according to claim 5, wherein said positioning arrangement includes at least one tab connected to the main body for engaging in the string bed.

7. A device for measuring stiffness of the string bed of a racket according to claim 6, wherein said at least one tab connected to the main body for engaging in the string bed, is adjustable to exactly engage a string pattern of the string bed of a racket.

8. A device for measuring stiffness of the string bed of a racket according to claim 6, wherein each tab of said at least one tab is replaceable with a different thickness tab adapted to be fixed to the main body to exactly engage the string pattern of the string bed of the racket.

9. A device for measuring stiffness of the string bed of a racket according to claim 6, wherein said at least one tab connected to the main body for engaging in the string bed includes a plurality of spaced apart tines to engage a string between two tines.

10. A device for measuring stiffness of the string bed of a racket according to claim 1, further including one of an audio indicator and visual indicator for providing an indication, in response to an output of the force measuring device, when the put signal output from the force measuring device has stopped changing for a predetermined time period.

11. A device for measuring stiffness of the string bed of a racket according to claim 10, wherein the biasing arrangement includes a tightening element, a receiving element having a threaded opening and a threaded shaft connected to the tightening element, with the tightening element located on a side of the string bed opposite the force measuring device, the receiving element located on an opposite side of the string bed and connected to the force measuring device, and the threaded shaft extending through the string bed for threaded receipt in the threaded opening of the receiving element in order to deflect the string bed upon rotation of the tightening element and causing said force measuring device to output a signal corresponding to the stiffness of the string bed, wherein said stop is positioned in said receiving element at a position such that contact of the stop by a free end of the threaded shaft sets a predetermined deflection of the string bed.

12. A device for measuring stiffness of the string bed of a racket according to claim 10, wherein the display displays the string bed stiffness in accordance with a change in a signal output of the force measuring device in response to a change of an output of a switch as the string bed moves from one of:
    a) a predetermined deflected position or
    b) a position past the predetermined deflected position to an undeflected neutral position.

13. A device for measuring stiffness of the string bed of a racket comprising:
    a main body adapted to sit on the string bed;
    a force measuring device mounted to the main body;
    a biasing arrangement connected to the force measuring device and adapted to be connected to the string bed for deflecting the string bed in relation to the force measuring device, and causing said force measuring device to output a signal corresponding to the deflection of the string bed;

a display for displaying the stiffness of the string bed in accordance with the signal output from the force measuring device;

a stop connected to the main body in a manner such that the stop is not moved by the deflection of the string bed when deflected by the biasing arrangement and which limits the string bed to a predetermined amount of deflection by the biasing arrangement;

a switch which provides an output when the string bed is deflected a predetermined distance by the biasing arrangement relative to the stop; and
and a connection pusher in contact with a side of the string bed between the string bed and the stop for activating said switch to change connections in an electrical circuit when the string bed is moved the predetermined amount, wherein the display displays the string bed stiffness in accordance with a difference in the signal output from the force measuring device of the string bed between an undeflected neutral position and a predetermined deflected position in response to a change of the output of the switch.

14. A device for measuring stiffness of the string bed of a racket, comprising:
- a main body adapted to sit on the string bed;
- a force measuring device mounted to the main body;
- a biasing arrangement connected to the force measuring device and adapted to be connected to the string bed for deflecting the string bed in relation to the force measuring device, and causing said force measuring device to output a signal corresponding to the stiffness of the string bed, the biasing arrangement including a pushing body which engages four strings of the string bed;
- a display for displaying the stiffness of the string bed in accordance with the signal output from the force measuring device;
- a stop connected to the main body and positioned to stop the biasing arrangement when the string bed is deflected a certain distance; and
- a positioning arrangement for positioning the main body on the string bed, the positioning arrangement including at least two tabs for engaging within at least two openings in the string bed.

15. A device for measuring stiffness of the string bed of a racket according to claim 14, wherein the positioning arrangement includes at least two tabs, wherein each tab of said at least two tabs are replaceable with a different thickness tab adapted to be fixed to the main body to exactly engage the string pattern of the string bed of the racket.

16. A device for measuring stiffness of the string bed of a racket according to claim 14, wherein said at least two tabs are connected to the main body for engaging in the string bed and said at least two tabs are adjustable to exactly engage the string pattern of the string bed of a racket.

17. A device for measuring stiffness of the string bed of a racket according to claim 14, wherein said at least two tabs connected to the main body for engaging in the string bed include a plurality of spaced apart tines to engage a string between two tines.

* * * * *